United States Patent [19]

Bacon et al.

[11] 4,424,735
[45] Jan. 10, 1984

[54] LINEAR LINKLESS AMMUNITION MAGAZINE

[75] Inventors: Lawrence D. Bacon, Santa Ana; Michael D. Golden, Costa Mesa, both of Calif.

[73] Assignee: Western Design Corporation, Irvine, Calif.

[21] Appl. No.: 263,994

[22] Filed: May 15, 1981

[51] Int. Cl.³ .............................................. F41D 10/22
[52] U.S. Cl. ....................................................... 89/34
[58] Field of Search ................ 89/33 D, 33 B, 33 BA, 89/33 BB, 33 BC, 34

[56] References Cited

U.S. PATENT DOCUMENTS

| | | | |
|---|---|---|---|
| 2,489,428 | 11/1949 | Mariner | 89/33 BB |
| 3,101,647 | 8/1963 | Greene | 89/33 BB |
| 4,252,049 | 2/1981 | Franz et al. | 89/34 |

Primary Examiner—Donald P. Walsh
Assistant Examiner—Maureen T. Ryan
Attorney, Agent, or Firm—Fowler, Lambert & Hackler

[57] ABSTRACT

A lightweight ammunition magazine capable of storing a plurality of "tiers" of ammunition within a semi-monocoque shell without the use of separation partitions between the tiers includes a top and a bottom panel separated by a plurality of partitions to form a plurality of ammunition storage and guiding channels between the top and bottom panels. An endless chain ladder is disposed within the storage and guiding channels for transporting the stored ammunition within the storage and guiding channels to a magazine exit port. The endless chain ladder is configured for holding at least two tiers of ammunition rounds between the top and bottom panels with a longitudinal axis of each ammunition round being approximately perpendicular to the top and bottom panels.

15 Claims, 7 Drawing Figures

LINEAR LINKLESS AMMUNITION MAGAZINE

BACKGROUND

The present invention relates generally to ammunition storage and more particularly to a lightweight magazine for storing ammunition rounds which is capable of transporting such stored ammunition rounds within the magazine to an exit port therein, such transport being relatively independent of magazine orientation. Further, the present invention enables the storage of ammunition rounds without the use of links, or the like, for connecting the ammunition rounds to each other.

Modern automatic weapons are capable of very high firing rates and consequently require on-hand storage of a great deal of ammunition in order to utilize this firepower over an average mission.

This problem is particularly acute for airborne weapons where space and weight is a critical factor. In addition, ammunition magazines available for use with aircraft weapons must be operable in any orientation as the aircraft needs to be capable of using its weapons during heavy maneuvering.

It is evident that if ammunition rounds are not made available to the gun feeding system at a reliable rate corresponding to the gun firing rate, gun timing may be disrupted, possibly causing gun malfunction.

Even though modern automatic guns have a high rate of fire, the ammunition rounds are typically fired one at a time and hence such guns require that rounds be fed to the gun, and removed from storage in a magazine, one at a time at the gun firing rate.

In many applications, such as aboard aircraft, particularly helicopters, ammunition storage is remote to the weapon. In addition, available space for ammunition storage even aboard ships, tanks and the like, limits the quantity of ammunition that can be stored if such ammunition must be held in a single tier or file even if such a "belt or chain" of ammunition is serpentined within a confined storage compartment or magazine.

If the ammunition rounds are held in a plurality of tiers, one tier above another within a magazine, a greater number of ammunition rounds may be held within a storage area having dimensions equal to or greater than the height of one ammunition round.

However, if a number of serpentined belts of ammunition are stored in multiple tiers, they must be separated to avoid entanglement with each other. Panels or partitions for separating the ammunition tiers are undesirable because of the non-payload weight they add to the magazine, and the space required for them.

Of particular interest is U.S. Pat. No. 2,489,428 issued to N. E. Mariner which shows a magazine for storing individual ammunition rounds in a serpentined fashion to facilitate the storage of a large number of ammunition rounds in a confined space. However, if a number of tiers of ammunition are to be stored utilizing a magazine according to the Mariner Patent, the magazines themselves must be stacked thus providing partitions for separating the ammunition tiers. Further, it is apparent from the Mariner Patent that the magazines would not be operable if stacked directly on one another.

Drum-type magazines have been used to store linkless ammunition for rapid fire automatic weapons, however, they are limited to their ability to provide high storage density in many envelopes because they are generally constrained to the shape of a right circular cylinder having a diameter determined, in part, by the size and shape of the ammunition.

The present invention provides a lightweight ammunition magazine capable of storing a plurality of "tiers" of ammunition within a single magazine without the use of space consuming separating partitions between the tiers which otherwise add to the non-payload weight of the magazine. Further, the ammunition rounds are held within the magazine and transported therein without the use of links for holding the ammunition together in a belt-like fashion. Because of the manner in which the ammunition rounds are held and transported within the magazine sliding frictional engagement between the rounds and internal portions of the magazine are substantially reduced or eliminated regardless of magazine orientation, and hence less power is required to accelerate and move the ammunition rounds within the magazine.

This feature enables the magazine of the present invention to supply ammunition rounds to a gun or feeder system at a steady rate which is independent of magazine orientation. In addition, the magazine may be configured to densely package ammunition rounds in generally any available space.

SUMMARY OF THE INVENTION

In accordance with the present invention an ammunition magazine includes a top and a bottom panel held in a spaced apart relationship by a plurality of approximately parallel partitions disposed therebetween. The parallel partitions form storage and guiding channels therebetween for ammunition rounds which are open between the top and bottom panels and sized to enable passage of at least two tiers of ammunition rounds therethrough with a longitudinal axis of each ammunition round being approximately perpendicular to the top and bottom panels. Hence, the storage and guiding channels have a height, measured between the top and bottom panels of at least twice the length of a single ammunition round. This semi-monocoque design substantially reduces the weight of the magazine by eliminating any partitions otherwise required by conventional ammunition magazines to separate the ammunition tiers and enables a greater "storage density" of the ammunition rounds within the magazine.

An endless chain ladder means is disposed within the storage and guiding channels for supporting the ammunition rounds in a spaced apart relationship with each other and for transporting the ammunition rounds within the storage and guiding channels to a magazine exit port. The endless chain ladder is configured for holding at least two tiers of ammunition rounds between the top and bottom panels with a longitudinal axis of each ammunition round being approximately perpendicular to the top and bottom panels. This multiple tier configuration requires less power to move the ammunition rounds within the magazine to the exit port than a single tier magazine at any selected ammunition delivery rate, as will be hereinafter discussed in greater detail.

Sprocket means are provided for supporting and transporting the endless chain ladder within the storage and guiding channels along with tensioner means for controlling tension in the endless chain ladder and drive sprocket means are included for moving the endless chain ladder and ammunition carried thereby within the storage and guiding channels to the magazine exit port.

More particularly, each parallel partition has at least one track disposed thereon adjacent the top and bottom panels and aligned with a track on another adjoining partition, and the endless chain ladder includes roller means for supporting ammunition rounds and for preventing sliding engagement of bottom portions of the ammunition rounds with the track.

The endless chain ladder is configured for enabling rolling engagement of the ammunition rounds with guides disposed on said partitions. This feature substantially reduces the frictional engagement of the ammunition rounds with internal surfaces of the magazine and enables, in part, the easy acceleration and movement of ammunition rounds within the magazine despite magazine orientation.

BRIEF DESCRIPTION OF THE DRAWINGS

The advantages and features of the present invention will appear from the following description when considered in conjunction with the accompanying drawings, in which.

DESCRIPTION

Figure 1:
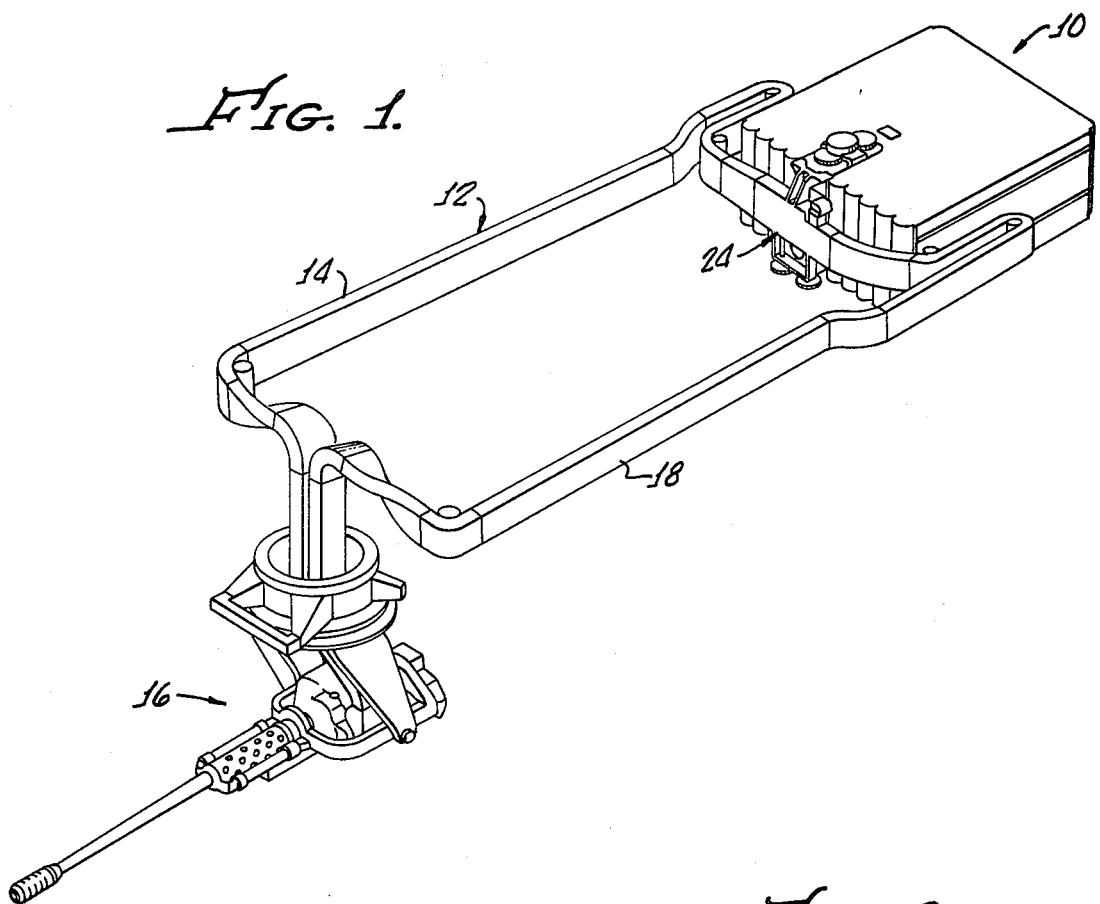
FIG. 1 is a respective view of the ammunition magazine according to the present invention in an operative relationship with an automatic rapid fire weapon as it may be employed in a helicopter mounted weapon, showing the ammunition magazine being remotely disposed from the weapon.

Turning now to FIG. 1 there is shown, in perspective view, a lightweight magazine 10 in accordance with the present invention showing the magazine in an operative relationship with an ammunition feed chute system 12 for transporting live ammunition rounds (not shown in FIG. 1) through a conduit 14 from the magazine 10 to a gun 16 and returning empty ammunition carriers (not shown in FIG. 1) to the magazine 10 via a conduit 18. It should be appreciated that the feed chute system 12 and the gun 16 are not part of the present invention but are shown as typical of an airborne installation, namely a helicopter, of the magazine 10 of the present invention showing the magazine as being remote from the gun 16.

Figure 2:
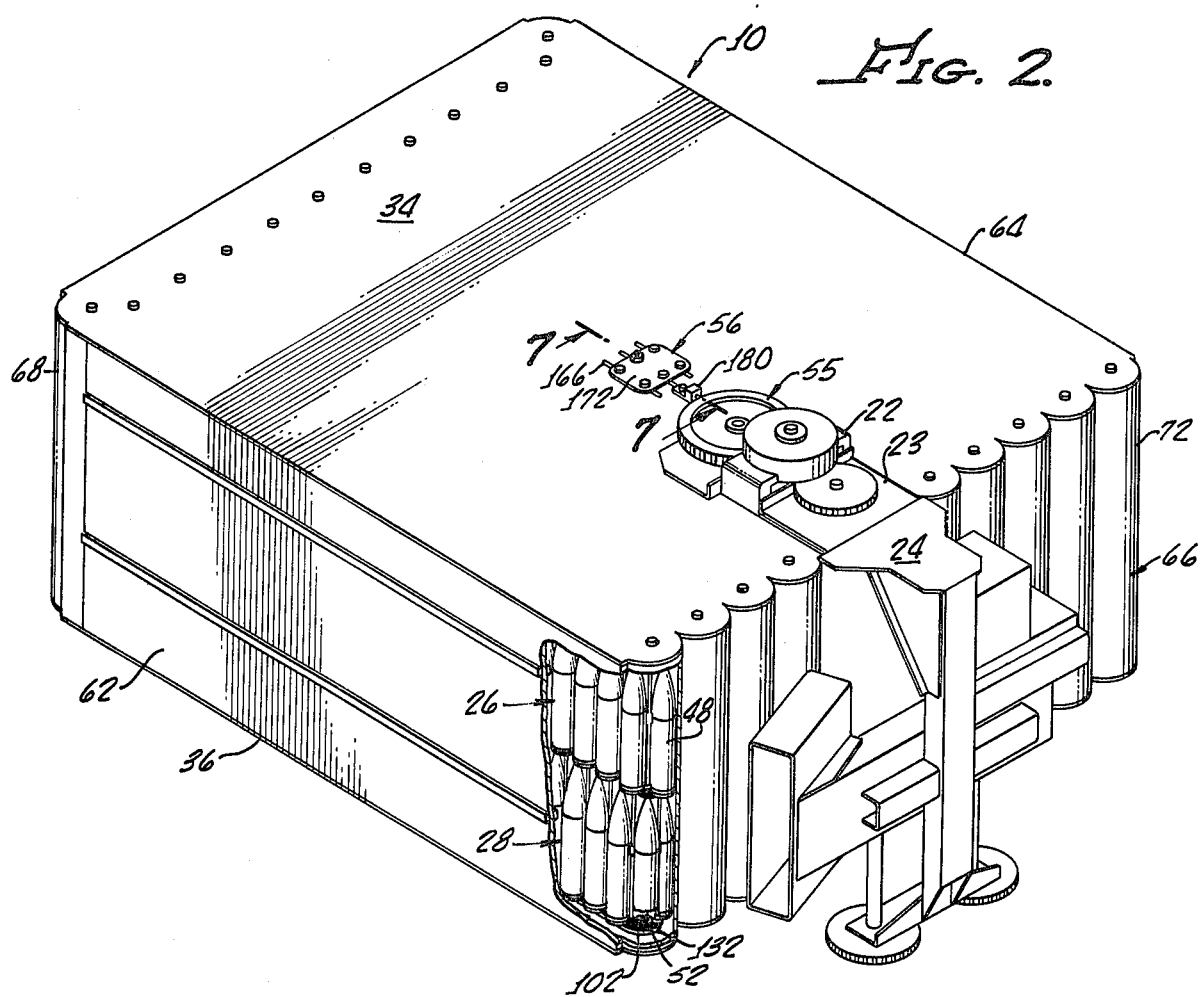
FIG. 2 is a perspective view of the ammunition magazine partially broken away to show ammunition rounds disposed therein and supported by an endless chain ladder with two "tiers" of ammunition rounds held approximately end to end between top and bottom panels without using a separation panel or partition to keep the tiers of ammunition rounds from contacting one another.

An enlarged perspective view of the magazine 10, partially broken away is shown in FIG. 2, along with an accelerator unit 22 for increasing the linear spacing of ammunition received from both upper tier 26 and lower tier 28, a merging unit 23 for merging the upper tier 26 and lower tier 28 of ammunition stored within magazine 10 into a single tier (or row) of ammunition, and a carrier drive unit 24 for transferring ammunition from merging unit 23 to feed chute system 12 (FIG. 1). Carrier drive unit 24 also includes drive means (not shown in FIG. 2) to power magazine 10 via direct gear train means included as part of merging unit 23 and accelerator unit 22. It is noted that accelerator unit 22, merging unit 23 and carrier drive unit 24 are not part of the present invention.

It should be appreciated that although two tiers 26, 28 of the ammunition rounds are shown in magazine 10 a greater number of tiers of ammunition rounds may be stored in a magazine, not shown, in accordance with the present invention. Further the magazine 10 according to the present invention may be configured for accommodating a wide range of ammunition calibers, although the present embodiment is suited for 30 mm ammunition rounds.

Generally, the magazine 10 includes a top panel 34 and a bottom panel 36 riveted to a plurality of approximately parallel partitions 38 (FIG. 3) forming storage and guiding channels 40 therebetween. The channels 40 are open between the top and bottom panels 34, 36 and are sized to enable passage of the tiers 26, 28 of ammunition therethrough as will be described hereinafter in greater detail.

The magazine 10 also includes an ammunition carrier, or endless chain ladder, 42, (FIG. 5) disposed in serpentine fashion throughout the channels 40, which provides a means for supporting individual ammunition rounds 48 in the upper and lower tier 26, 28 arrangement, and for transporting the ammunition rounds 48 within the storage and guiding channels 40 to a magazine exit port 50 (see FIG. 3) which is engaged by the accelerator 22, merger 23, and handoff assembly 24.

Idler sprockets 52 provide means for supporting and transporting the endless chain ladder 42 within the storage and guiding channels 40 and three drive sprockets 54 (FIG. 3) driven by an exterior drive gear 55 (FIG. 2) moves the endless chain ladder 42, and the ammunition 48 carried thereby, through the channels 40 in the direction of arrows 49, to the magazine exit port 50, while a chain tensioner 56 provides tension in the endless chain ladder 42 as will be described hereinafter in greater detail.

It should be appreciated that although the magazine 10 is shown in a generally right rectangular shape it may be configured with storage and guiding channels 40 of unequal length so that the magazine can be fitted within nearly any shape and the number of ammunition tiers may be selected to efficiently utilize the height available.

An advantage of the present invention relates to the power required to accelerate and move the ammunition rounds within the magazine 10. For a fixed ammunition delivery rate to a given point, multiple tiers of ammunition require less power. For example, if:

F = total pulling force on the chain ladder 42;
W = moving weight per ammunition round 48, (including the chain ladder);
m = number of ammunition rounds in the magazine;
n = number of tiers in the magazine;
S = spacing of ammunition rounds in the magazine;
ṁ = delivery rate of the ammunition rounds;
V = linear velocity of the chain ladder; and
u = the overall coefficient of friction, when the linear velocity of the chain ladder to deliver a fixed rate of ammunition is:

$$V = \frac{\dot{m} \times S}{n} \quad (1)$$

Since the force required to move the ammunition rounds and chain ladder is approximately:

$$F = W \times m \times u \quad (2)$$

the steady state power required to move the ammunition rounds is $$HP_{ss} = F \times V \quad (3)$$

$$HP_{ss} = \frac{\dot{m} \times S \times W \times m \times u}{n}$$

Thus, the steady power to move the ammunition round is inversely proportional to the number of tiers.

Similarly, the power required to accelerate the ammunition rounds is:

$$HP_{acc} \propto \text{Kinetic energy of the moving ammunition rounds} \quad (4)$$

OR $$HP_{acc} \propto \frac{W \times M}{2} \cdot \frac{\dot{m}^2 S^2}{n^2}$$

and is inversely proportional to the square of the number of tiers of ammunition.

More particularly, the semi-monocque magazine includes a pair of side walls 62, 64 and a pair of end walls 66, 68 attached to the top and bottom panels 34, 36 in a manner to prevent dust or grit to enter the magazine which may cause increased friction during transport of the ammunition rounds 48 within the magazine and thereby increase the load on the endless chain ladder which may limit ammunition to delivery. As soon in FIG. 4 in cross section, the partitions 38 may have cut out portions 70 for reducing the magazine 10 overall weight. In addition, the top and bottom panels may be constructed of a lightweight metal such as 6061-T6 aluminum, and the partitions 38 may be constructed of a lightweight honeycomb of aluminum or plastic.

The end walls 66 may have contoured portions 72 corresponding to the idler sprockets 52 and spaced therefrom to enable passage of the ammunition rounds therebetween.

Figure 3:
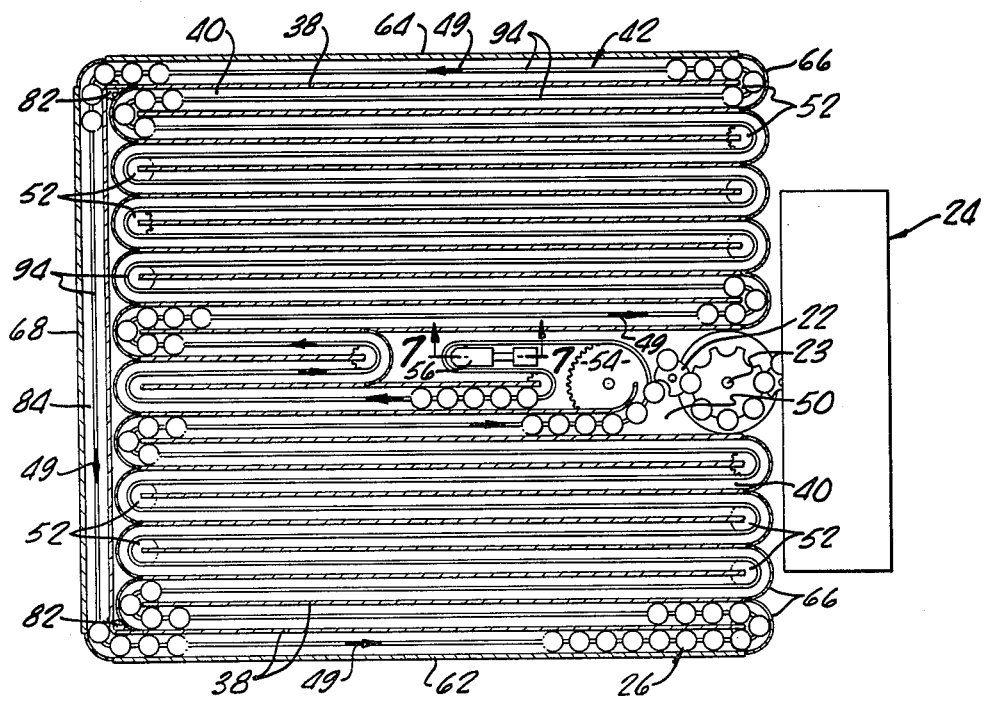
FIG. 3 is a plan view cross section of the ammunition magazine showing a serpentine path the endless chain ladder means follows between the storage and guiding channels, along with tensioner means for providing tension to the endless chain ladder means and drive sprocket means for transporting the endless chain ladder and ammunition rounds carried thereby through the storage and guiding channels to an ammunition magazine exit port.

As most clearly shown in FIG. 3, idler sprockets 52 are disposed between the partitions 38 proximate the end walls 66, 68 and engage the endless chain ladder 42 for supporting the chain ladder in a serpentine path within the channels 40. A set of outboard idler sprockets 82 guide the chain ladder through a rear channel 84 proximate the end wall 68 from the one side wall 62 to the other side wall 64.

Figure 4:
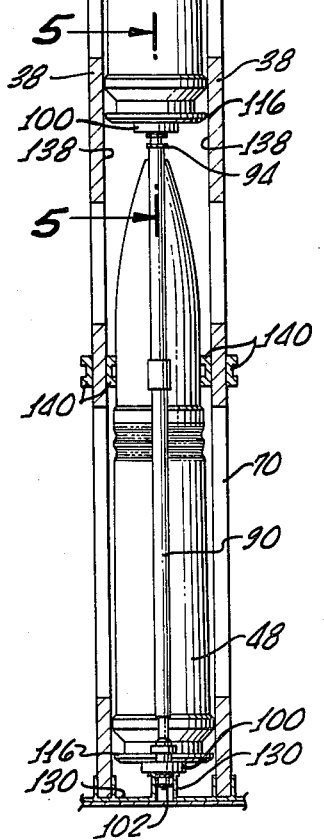
FIG. 4 is cross section view of the endless chain ladder means showing two tiers of ammunition rounds being supported between crossbars in a staggered relationship.
Figure 5:
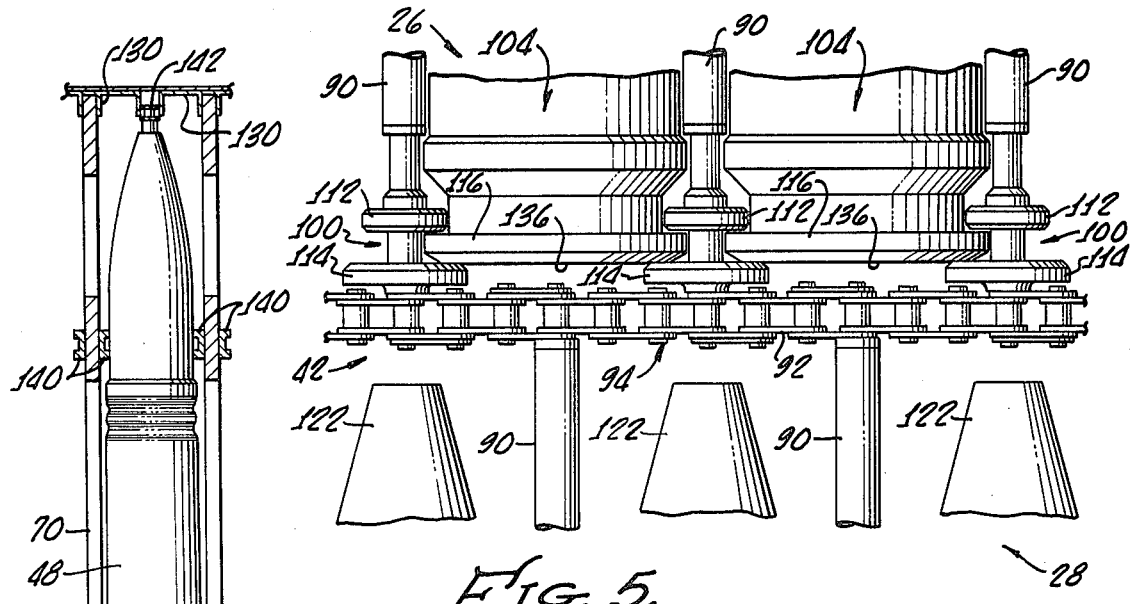
FIG. 5 is an enlarged view of a portion of the endless chain ladder means taken along line 5—5 in FIG. 4, showing more clearly the staggered relationship between the two tiers of ammunition rounds and rollers co-axially aligned with each crossbar for engaging tracks (not shown) disposed on the parallel partitions and for preventing sliding engagement of bottom portions of ammunition rounds with the tracks.
Figure 6:
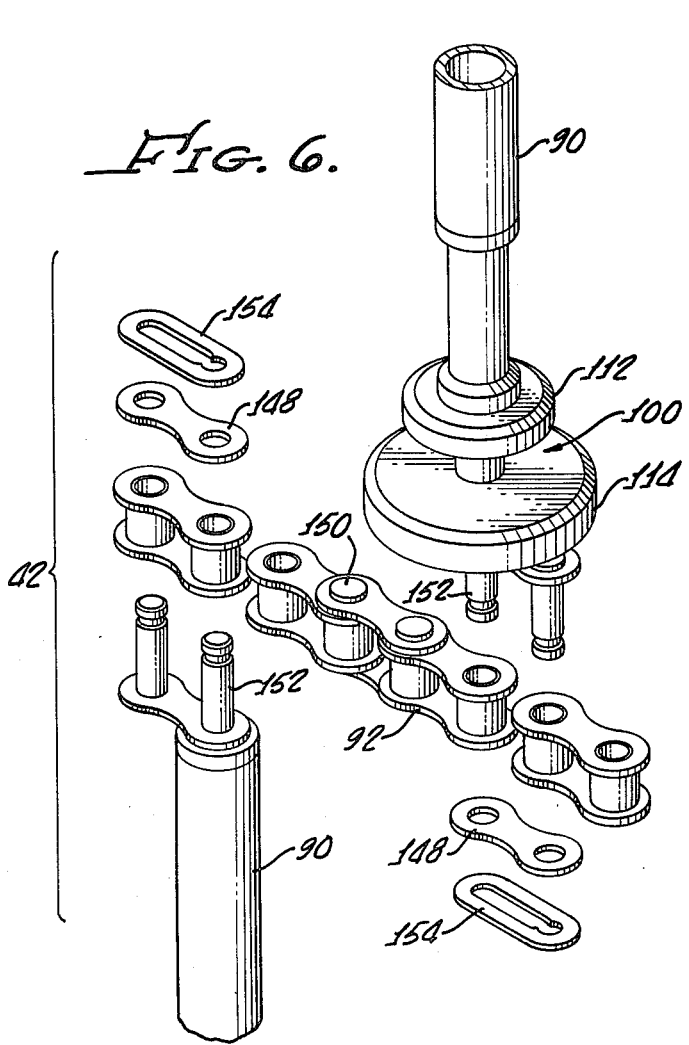
FIG. 6 is an exploded perspective view of the roller and chain link portions of the endless chain ladder means showing means for connecting the crossbars with the chain links; and, FIG. 7 is a cross section view taken along line 7—7 of FIG. 2 of a tensioner for providing tension to the endless chain ladder means.

Turning now to FIGS. 4, 5 and 6, the endless chain ladder 42 includes a plurality of crossbars 90 held in a spaced apart relationship between a plurality of chain links 92 (FIG. 6). The spacing between adjacent crossbars 90 is selected to accommodate an ammunition round 48.

The crossbars 90 have a length approximately equal to the length of the ammunition rounds 48, and are arranged in two tiers 26, 28 interconnected by a center chain 94.

As most clearly shown in FIG. 5, the two tiers 26, 28 of the ammunition rounds 48 are between the crossbars 90 in a staggered relationship with the ammunition rounds 48 of the lower tier 28 being approximately coaxially aligned with the crossbars 90 of the upper tier 26.

The center chain 94 performs a dual function in supporting both the upper and lower tiers 26, 28 of ammunition rounds 48 within the storage and guiding channels 40 and, in addition, separating the upper and lower ammunition tiers, thus eliminating the need for a partition therebetween. Space between the upper and lower ammunition tiers is further reduced, and weight reduced, by the present invention because separate guide and transport means are not required for each ammunition tier as would be required if the tiers were separated by a partition or the like.

A roller 100 is rotatably and coaxially mounted with each crossbar 90 adjacent the center chain 94 and a bottom chain 102 and adapted for engaging a bottom portion 104 of each ammunition round 48. More particularly, the roller 100 includes an upper disk 112 fixed to a lower disk 114 in a spaced apart relationship for engaging an ammunition extraction lip 116 therebetween. The upper and lower disks 112, 114 prevents longitudinal movement of the ammunition round 48 along the crossbar 90 thus preventing contact of nose or fuse portions 122 of ammunition rounds 48 in the upper tier 26 from contacting the top panel 34 and nose portions 122 of ammunition rounds 48 in the lower tier 28 from contacting the center chain 94 despite magazine 10 orientation.

As shown in FIGS. 2 and 4, the rollers 100 are supported within the storage and guiding channels 40 by, tracks 130 (FIG. 4) attached to the partitions 38 and side panels 62, 64 adjacent the top and bottom panels 34, 36. The tracks serve to guide the endless chain ladder within the channels 40 and the roller 100 prevent a weight bearing engagement of the ammunition round between portions, or base area 136, thereon with interior surfaces 138 of the partitions 38 or side walls 62, 64 and the bottom panel 36. A track 132 (FIG. 2) attached to the end walls 66, 68 is aligned with the track 130 on the partitions 38 to support and guide the endless chain ladder between the partitions 38 and the end walls 66, 68.

The roller 100 may be fabricated from a material, such as Delrin, having a low coefficient of friction, and is free to rotate in order to achieve a uniform wear distribution and a number of guides 140 attached to the partitions 38 and side panels 62, 64 center the ammunition rounds 48 within the channels 40. Hence, when the magazine 10 is oriented so that the ammunition rounds 48 are supported, in part, by the guides 140, the ammunition rounds are free to roll therealong thus eliminating any sliding frictional engagement therebetween.

The center and bottom chains 94, 102 as well as top chain 142 (FIG. 4) may be of conventional construction having the individual links 92 interconnected by link plates 148 on pins 150. A pin 152 formed in each end of the crossbars 90 is held to each chain link 92 by a spring clip 154.

Figure 7:
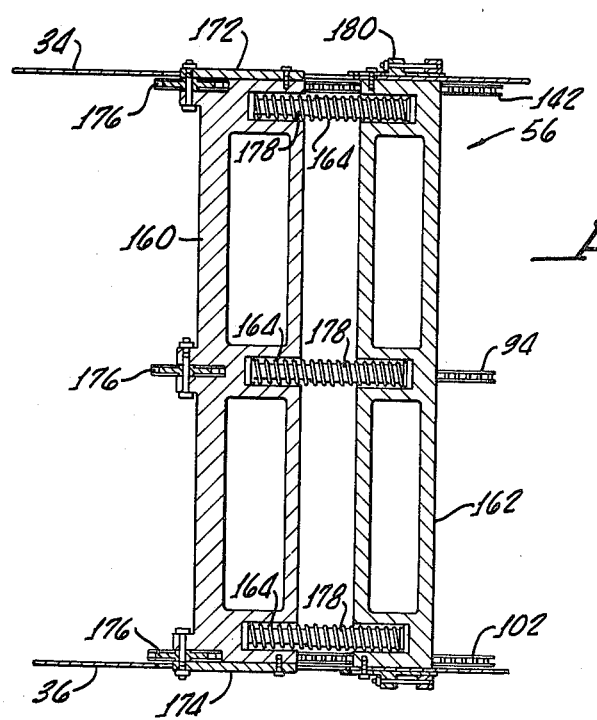

As shown in FIG. 7, the chain tensioner 56 generally includes an idler support member 160 slidably mounted between the top and bottom panels 34, 36, a spring support member 162 and compression springs 164 disposed therebetween. A set of slots 166 in the top panel 34 and corresponding slots (not shown) in the bottom panel enable the idler support member to be attached to slide plates 172, 174.

Three idler sprockets 176 are rotatably fixed to the idler support member 160 for engaging the top, center and bottom chains 142, 94, 102 and the springs 164 bias the idler sprockets 176 there against to apply tension throughout the endless chain ladder 42. The springs 164 may be supported by spring guides 178 and are sized to provide sufficient tension in the endless chain ladder 42 to enable smooth movement of the ladder and ammunition rounds 48 throughout the channels 40 and to provide compensation for chain elastic stretch during operation, chain wear, fabrication tolerances as well as thermal growth differentials between the steel chains 94, 102, 142 and the aluminum panels and partitions 34, 36, 38.

The slots 166 enable a total chain slack takeup of approximately four inches. An adjustable stop 180 enables the idler support member 160 to take up chain slack but prevents excessive loosening of the chain ladder 42 during loading of ammunition rounds 48 into the magazine 10 (reverse operation of the magazine).

Although there has been described hereinabove a particular arrangement of an ammunition magazine in accordance with the present invention for the purpose of illustrating the manner in which the invention may be used in advantage, it should be appreciated that the invention is not limited thereto. Accordingly, any and all modifications, variations or equivalent arrangements which may occur to those skilled in the art, should be considered to be within the scope of the invention as defined in the appended claims.

We claim:

1. An ammunition magazine for the storage of ammunition rounds comprising:
   (a) a top and a bottom panel held in a spaced apart relationship by a plurality of continuous approximately parallel partitions disposed therebetween, said partitions forming storage and guiding channels for ammunition rounds, said channels extending from said top to said bottom panel said storage and guiding channels being open from said top to said bottom panel and sized to enable passage of at least two tiers of ammunition rounds therethrough with a longitudinal axis of each ammunition round being approximately perpendicular to the top and bottom panels;
   (b) a single endless chain ladder means disposed within the storage and guiding channels for supporting said ammunition rounds in a spaced apart relationship with each other and for transporting said ammunition rounds within said storage and guiding channels to a magazine exit port, said single endless chain ladder means being configured for holding at least two tiers of ammunition rounds between the top and bottom panels with a longitudinal axis of each ammunition round being approximately perpendicular to the top and bottom panels;
   (c) idler sprocket means for supporting and transporting the endless chain ladder means within said storage and guiding channels;
   (d) tensioner means for controlling tension in said endless chain ladder means; and,
   (e) drive sprocket means, for moving said endless chain ladder means and ammunition carried thereby within said storage and guiding channels to said magazine exit port.

2. The ammunition magazine of claim 1 wherein the endless chain ladder means includes a plurality of crossbars held in a spaced apart relationship by a plurality of chain links, each said ammunition round being held between two of said crossbars.

3. The ammunition magazine of claim 2 wherein each parallel partition has at least one track means therein disposed adjacent said top and bottom panels and aligned with a track means on an adjoining partition, for guiding said endless chain ladder means within said storage and guiding channels.

4. The ammunition magazine of claim 3 wherein the endless chain ladder means includes roller means disposed in a coaxial relationship with each crossbar for engaging said ammunition rounds and preventing movement of the ammunition rounds along the ammunition round longitudinal axis.

5. The ammunition magazine of claim 4 wherein the endless chain ladder means includes two sets of crossbars joined by a plurality of center chain links, said ammunition rounds being supported between individual crossbars of each set of crossbars.

6. The ammunition magazine of claim 5 wherein the roller means is configured for supporting base portions of said ammunition rounds and for preventing sliding engagement said base portions of said ammunition rounds with said track means.

7. An ammunition magazine for the storage of ammunition rounds comprising:
   (a) a top and bottom panel held in a spaced apart relationship by a plurality of continuous approximately parallel partitions disposed therebetween, said partitions forming Storage and guiding channels, said channels extending from said top to said bottom panel, said storage and guiding channels being open from said top to said bottom panel and sized to enable passage of at least two tiers of ammunition rounds therethrough with a longitudinal axis of each ammunition round being approximately perpendicular to the top and bottom panels.
   (b) a single endless chain ladder means disposed within the storage and guiding channels for supporting said ammunition rounds in a spaced apart relationship with each other and for transporting said ammunition rounds within said storage and guiding channels to a magazine exit port, said single endless chain ladder means being configured to holding at least two tiers of ammunition rounds between the top and bottom panels with a longitudinal axis of each ammunition round being approximately perpendicular to the top and bottom panels without substantial sliding frictional engagement of the ammunition rounds with internal portions of the parallel partitions or the top and bottom panels;

(c) idler sprocket means for supporting and transporting the endlesschain ladder means within said storage and guiding channels;
(d) tensioner means for controlling tension in said endless chain ladder; and,
(e) drive sprocket means, for moving said endless chain ladder means and ammunition carried thereby within said storage and guiding channels to said magazine exit port.

8. An ammunition magazine for the storage of ammunition rounds comprising:
(a) a top and bottom panel held in a spaced apart relationship by a plurality of continuous approximately parallel partitions disposed therebetween, said partitions forming storage and guiding channels for ammunition rounds, said channels extending from said top to said bottom panel, said storage and guiding channels being open from said top to said bottom panel and having a height, measured between the top and bottom panels, at least equal to approximately twice the length of a single ammunition round;
(b) a single endless chain ladder means disposed within the storage and guiding channels for supporting said ammunition rounds in a spaced apart relationship with each other and for transporting said ammunition rounds within said storage and guiding channels to a magazine exit port, said single endless chain ladder means being configured for holding at least two tiers of ammunition rounds between the top and bottom panels with a longitudinal axis of each ammunition round being approximately perpendicular to the top and bottom panels;
(c) idler sprocket means for supporting and transporting the endless chain ladder means within said storage and guiding channels;
(d) tensioner means for controlling tension in said endless chain ladder; and,
(e) drive sprocket means for moving said endless chain ladder means and ammunition carried thereby within said storage and guiding channels to said magazine exit port.

9. An ammunition magazine for the storage of ammunition rounds comprising:
(a) a top and a bottom panel held in a spaced apart relationship by a plurality of continuous approximately parallel partitions disposed therebetween, said partitions forming storage and guiding channels for linkless ammunition rounds, said channels extending from said top to said bottom panel, said storage and guiding channels being open from said top to said bottom panel and having a height, measured between the top and bottom panels, approximately twice the length of a single linkless ammunition round;
(b) a single endless chain ladder means disposed within the storage and guiding channels for supporting said linkless ammunition rounds in a spaced apart relationship with each other and for transporting said linkless ammunition rounds within said storage and guiding channels to a magazine exit port, said single endless chain ladder means being configured for holding at least two tiers of linkless ammunition rounds between the top and bottom panels with a longitudinal axis of each linkless ammunition round being approximately perpendicular to the top and bottom panels;
(c) idler sprocket means for supporting and transporting the endless chainladder means within said storage and guiding channels;
(d) tensioner for controlling tension in said endless chain ladder; and,
(e) drive sprocket means, for moving said endless chain ladder means and linkless ammunition carried thereby within said storage and guiding channels to said magazine exit port.

10. The ammunition magazine of claim 1 or 9 wherein the endless chain ladder means is configured for enabling rolling engagement of the ammunition rounds with guides disposed on said partitions.

11. The ammunition magazine of claim 9 wherein the endless chain ladder means includes two tiers of crossbars, each tier of crossbars including a plurality of individual crossbars held in a spaced apart relationship by a plurality of chain links, each said ammunition round being held between two of said crossbars.

12. The ammunition magazine of claim 11 wherein the individual crossbars of each tier of crossbars are joined to a center chain.

13. The ammunition magazine of claim 12 wherein each crossbar has coaxially mounted roller means for engaging said ammunition rounds and for preventing sliding engagement of base portions of said ammunition rounds with the parallel partitions and the bottom panel.

14. The ammunition magazine of claim 13 wherein the roller means for engaging said ammunition rounds is rotatably mounted to each crossbar.

15. Ammunition magazine for storage of ammunition rounds comprising:
(a) a top and a bottom panel held in a spaced apart relationship by a plurality of approximately parallel partitions disposed therebetween said partitions forming storage and guiding channels for ammunition rounds between said top and bottom panels, said storage and guiding channels being open between said top and bottom panels and sized to enable passage of at least two tiers of ammunition rounds therethrough with a longitudinal axis of each ammunition round being approximately perpendicular to the top and bottom panels;
(b) endless chain ladder means disposed within the storage and guiding channels for supporting said ammunition rounds in a spaced apart relationship with each other and for transporting said ammunition rounds within said storage and guiding channels to a magazine exit port, said endless chain ladder means being configured for holding at least two tiers of ammunition rounds between the top and bottom panels with a longitudinal axis of each ammunition round being approximately perpendicular to the top and bottom panels, said endless chain ladder means including two sets of crossbars joined by a plurality of center chain links, individual crossbars of each set of crossbars being held in a spaced apart relationship by a plurality of chain links and individual crossbars of each set of crossbars having longitudinal axes approximately midway between the longitudinal axes of two individual crossbars of the other set of crossbars, said endless chain ladder means further including roller means disposed in a coaxial relationship with each crossbar for engaging said ammunition rounds and preventing movement of the ammunition rounds along its ammunition round longitudinal axis, said ammunition rounds being supported between individual crossbars of each set of crossbars, said roller means being configured for supporting base portions of said ammunition rounds and for preventing sliding engagement of the ammunition round base portions with said track means;

(c) at least one track means disposed on each parallel partition adjacent said top and bottom panels and aligned with a track means disposed on an adjoining partition, for guiding said endless chain ladder means within said storage and guiding channels;

(d) idler sprocket means for supporting and transporting the endless chain ladder means within said storage and guiding channels;

(e) tensioner means for controlling tension in said endless chain ladder means; and, (f) drive sprocket means, for moving said endless chain ladder means and ammunition carried thereby within said storage and guiding channels to said magazine exit port.

* * * * *